United States Patent
Sassolini et al.

(10) Patent No.: US 7,270,003 B2
(45) Date of Patent: Sep. 18, 2007

(54) BMEMS-TYPE HIGH-SENSITIVITY INERTIAL SENSOR AND MANUFACTURING PROCESS THEREOF

(75) Inventors: Simone Sassolini, Vidigulfo (IT); Marco Del Sarto, Massa (IT); Lorenzo Baldo, Bareggio (IT); Mauro Marchi, Magenta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/189,544

(22) Filed: Jul. 25, 2005

(65) Prior Publication Data

US 2006/0042385 A1    Mar. 2, 2006

(30) Foreign Application Priority Data

Jul. 29, 2004    (EP) .................................. 04425573

(51) Int. Cl.
 *G01P 15/125*    (2006.01)
 *G01C 19/00*    (2006.01)
(52) U.S. Cl. .............................. 73/514.32; 73/514.38; 73/504.12; 73/504.14
(58) Field of Classification Search ............. 73/514.32, 73/514.36, 514.38, 504.12, 504.14, 504.15, 73/504.04, 514.29
See application file for complete search history.

(56) References Cited

U.S. PATENT DOCUMENTS

| | | | | |
|---|---|---|---|---|
| 5,016,073 A | | 5/1991 | Elliott et al. | ................... 357/26 |
| 5,987,986 A | | 11/1999 | Wyse et al. | .............. 73/504.12 |
| 6,155,115 A | | 12/2000 | Ljung | ...................... 73/504.12 |
| 6,367,326 B1 | | 4/2002 | Okada | ...................... 73/504.12 |
| 6,388,300 B1 | * | 5/2002 | Kano et al. | .................. 257/419 |
| 6,679,995 B1 | * | 1/2004 | Banjac et al. | .................. 216/2 |
| 6,736,008 B2 | * | 5/2004 | Kumagai et al. | ......... 73/504.14 |
| 6,744,173 B2 | * | 6/2004 | Behin et al. | ................. 310/309 |
| 6,923,061 B2 | * | 8/2005 | Tsubaki | .................... 73/514.32 |
| 7,004,026 B2 | * | 2/2006 | Kano et al. | .............. 73/514.32 |
| 7,004,027 B2 | * | 2/2006 | Suzuki | .................... 73/514.32 |
| 2003/0002938 A1 | | 2/2003 | Challoner | ................ 73/504.04 |

\* cited by examiner

*Primary Examiner*—Helen Kwok
(74) *Attorney, Agent, or Firm*—Lisa K. Jorgenson; Ronald Stern; Seed IP Law Group PLLC

(57) ABSTRACT

The semiconductor inertial sensor is formed by a rotor element and a stator element electrostatically coupled together. The rotor element is formed by a suspended mass and by a plurality of mobile electrodes extending from the suspended mass. The stator element is formed by a plurality of fixed electrodes facing respective mobile electrodes. The suspended mass is supported by elastic suspension elements. The suspended mass has a first, larger, thickness, and the elastic suspension elements have a second thickness, smaller than the first thickness.

17 Claims, 7 Drawing Sheets

BMEMS-TYPE HIGH-SENSITIVITY INERTIAL SENSOR AND MANUFACTURING PROCESS THEREOF

BACKGROUND OF THE INVENTION

1. Field of the Invention

The present invention relates to a MEMS-type high-sensitivity inertial sensor and to the manufacturing process thereof.

2. Description of the Related Art

As is known, techniques of micromachining of semiconductors are used also for manufacturing electromechanical microdevices (so-called micro-electro-mechanical-systems or MEMS), such as sensors and actuators of various types. In particular, the techniques of micromachining are advantageously used for manufacturing inertial sensors, utilized for example in the automotive sector or within apparatuses equipped with stand-by functions, for recovery of functionality starting from the stand-by condition upon detection of a movement.

Currently, inertial sensors are formed preferably by surface micromachining, wherein the mobile and fixed elements that form the sensor (rotor and stator and corresponding electrodes) are formed in a same structural layer, typically a semiconductor layer, of a mono-crystalline or polycrystalline type.

In this type of sensors, the thickness of the structural layer influences both the compliance of the structure to mechanical stresses (stiffness) and the mass. Any increase in the thickness of the structural layer brings about an increase in inertia (as a result of the increase in the mass), and consequently in the mechanical sensitivity of the sensor, i.e., the capacity for the rotor to modify its relative position when subjected to a stress, without any increase in the overall dimensions of the sensor.

However, the increase in the thickness determines an increase not only in the mass of the system but also in the stiffness of the springs, thus countering the improvement in the sensitivity of the sensor.

Not even other ways of increasing the mechanical sensitivity of the sensor are able to solve the problem. For example, by making springs that are more compliant, it is possible to increase the degree of movement of the rotor for a same applied stress; however, in this case the capacity to reject movements in other directions is reduced, and the sensor could yield false readings.

For a better understanding of the problem referred to above, in particular the one linked to the increase in thickness, reference may be made to FIGS. 1-3, corresponding to a known translational inertial sensor.

In FIGS. 1 and 2, an inertial sensor 1 comprises a body of semiconductor material, formed by a substrate 2 and by a structural layer 3, overlying one another. The structural layer 3 forms a rotor 5 and a stator 6, extending above the substrate 2 but set at a distance therefrom by an air gap 7. The air gap 7 is obtained in a known way by removing a portion of a sacrificial layer, for example of silicon oxide, a remaining portion of which is designated by 8.

The rotor 5 comprises a suspended mass 10, here of a substantially parallelepipedal shape, and first and second mobile electrodes 11a, 11b extending from two opposite sides of the suspended mass 10 and arranged parallel to one another. The stator 6 comprises first and second fixed electrodes 12a, 12b extending parallel to one another and to the mobile electrodes 11a, 11b. In particular, the first fixed electrodes 12a are comb-fingered to the first mobile electrodes 11a, and the second fixed electrodes 12b are comb-fingered to the second mobile electrodes 11b. The fixed electrodes 12a, 12b extend from a fixed supporting structure 13, carried by the substrate 2, only some parts whereof are visible in FIGS. 1 and 2.

As represented schematically in FIG. 1, the rotor 5 is supported by the fixed structure 13 via elastic elements or springs 15 that enable oscillation of the rotor 5 in the direction indicated by the arrow A. The anchorage portions of the rotor 5 are obviously electrically insulated from the stator 6 via junction insulations, dielectric insulations, or by trenches, in a per se known manner that is not illustrated in the drawings.

In use, the rotor 5 is biased at a sinusoidal a.c. voltage V1, as represented in FIG. 1 by a voltage generator 16, while the stator 6 is connected to a sensing circuit 20 comprising two operational amplifiers 21a, 21b, each connected to a respective set of fixed electrodes 12a, 12b.

In detail, the operational amplifiers 21a, 21b have an inverting input connected to the respective set of fixed electrodes 12a, 12b, and a non-inverting input connected to ground. A feedback capacitor 23a, 23b is moreover connected between an output 24a, 24b and the inverting input of a respective operational amplifier 21a, 21b. The resulting electrical diagram is illustrated in FIG. 3, which relates to both the operational amplifiers 21a, 21b and wherein consequently the elements represented have been identified without using the letters a and b.

As may be noted in particular from FIG. 2, the fixed electrodes 12 and the mobile electrodes 11 have a thickness t equal to the thickness of the structural layer 3 and a length l, and are arranged at a distance from the adjacent electrode of an opposite type (i.e., mobile or fixed) by a space g, which is variable and depends upon the instantaneous position of the rotor 5.

In practice, as illustrated in the equivalent circuit of FIG. 3, the fixed electrodes 12 and the mobile electrodes 11 on each side of the suspended mass 5 form a variable capacitor 25 having a capacitance C1 given by:

$$C1 = \varepsilon_0 N \frac{A}{g} = \varepsilon_0 N l \frac{t}{g} \qquad (1)$$

where $\varepsilon_0$ is the dielectric constant in a vacuum; N is the number of fixed electrodes 12 connected to each operational amplifier 21; l, t, g are the quantities indicated above; A represents the facing area, which here is approximately equal to l×t, since the length of facing between fixed electrodes 12 and mobile electrodes 11 can be considered, to a first approximation, equal to l.

From Eq. (1) it is evident how the capacitance C1 is directly proportional to the thickness t of the structural layer 3.

In general, it is moreover possible to state that the mass M of the rotor 5 and hence substantially of the suspended mass 10 is given by the formula:

$$M \propto \rho t_M A = \rho t_M l_{typ,rot}^2 \qquad (2)$$

where $\rho$ is the density of the material (silicon), $t_M$ is the thickness of the suspended mass 10, and $l_{typ,rot}$ is the typical length (which is linked to the width of the suspended mass 10 and thus to the overall dimensions) of the sensor 1.

The stiffness k of a spring, instead, is given by:

$$k \propto \frac{t_k}{l_{typ,s}^n} \quad (3)$$

where $t_k$ is the thickness of the spring, $l_{typ,s}$ is the typical length of the spring, and n is a coefficient linked to the type of sensor and is typically equal to 3 for planar sensors, whether of a linear type or of a rotational type.

The sensitivity S of a sensor of this type is:

$$S \propto \frac{M}{k} = \rho \frac{t_M}{t_k} l_{typ,rot}^2 \cdot l_{typ,s}^n \quad (4)$$

From Eq. (4) it may thus be noted that, in a typical micromachining process, in which the two thicknesses $t_M$ and $t_k$ are equal, the sensitivity S is invariant to the variation in thickness.

Thus, currently, when it is desired to increase the sensitivity of the sensor, the design aims at increasing the occupation of area (i.e., $l_{typ}$) of the sensor either to increase the mass of the system or to reduce the stiffness of the elastic suspension springs.

Similar considerations apply to an inertial sensor of rotational type, the simplified structure whereof is shown in FIG. 4 where, for reasons of clarity of illustration, the same reference numbers as those of FIGS. 1 and 2 have been used. In detail, FIG. 4 shows an inertial sensor 1' having a rotor 5, a stator 6, a suspended mass 10, mobile electrodes 11, fixed electrodes 12, springs 15, and a fixed structure 13. In a way not shown, the inertial sensor 1' is connected to a sensing circuit similar to the sensing circuit 20 of FIG. 1, so that the inertial sensor 1' has the equivalent circuit illustrated in FIG. 3 and has an output voltage V0 given by Eq. (4).

In this case, the inertial sensor 1' has a moment of inertia $J_z$ with respect to the axis Z of rotation equal to:

$$J_Z = \frac{1}{2} M R^2 \quad (5)$$

where M is the mass (practically coinciding with that of the suspended mass 10), and R is the mean radius of the rotor 5, substantially due to the radius of the suspended mass 10.

As may be noted, the moment of inertia is directly proportional to the mass, which is in turn directly proportional to the thickness. Since the mechanical sensitivity of the inertial sensor 1' of rotational type is linked directly to the moment of inertia, the increase in the thickness of the structural layer accommodating both the rotor 5 and the stator 6 determines an increase in the mechanical sensitivity. However, also in this case this effect is nullified at the sensing circuit. As for the inertial sensor 1 of FIGS. 1 and 2, then, it is not possible to increase the sensitivity of the inertial sensor simply by increasing the thickness of the structural layer.

BRIEF SUMMARY OF THE INVENTION

According to an embodiment of the present invention, there are provided a semiconductor inertial sensor and the manufacturing process thereof.

In practice, according to one aspect of the invention, the thickness of the rotor and that of the spring (elastic suspension) are different from one another, even though they are provided in a same structural layer. In this way, it is possible to separate the influence of the thickness on the stiffness and on the mass of the inertial sensor.

BRIEF DESCRIPTION OF THE SEVERAL VIEWS OF THE DRAWINGS

For an understanding of the present invention, preferred embodiments thereof are now described, only as non-limiting examples, with reference to the attached drawings, wherein.

DETAILED DESCRIPTION OF THE INVENTION

Figure 5:
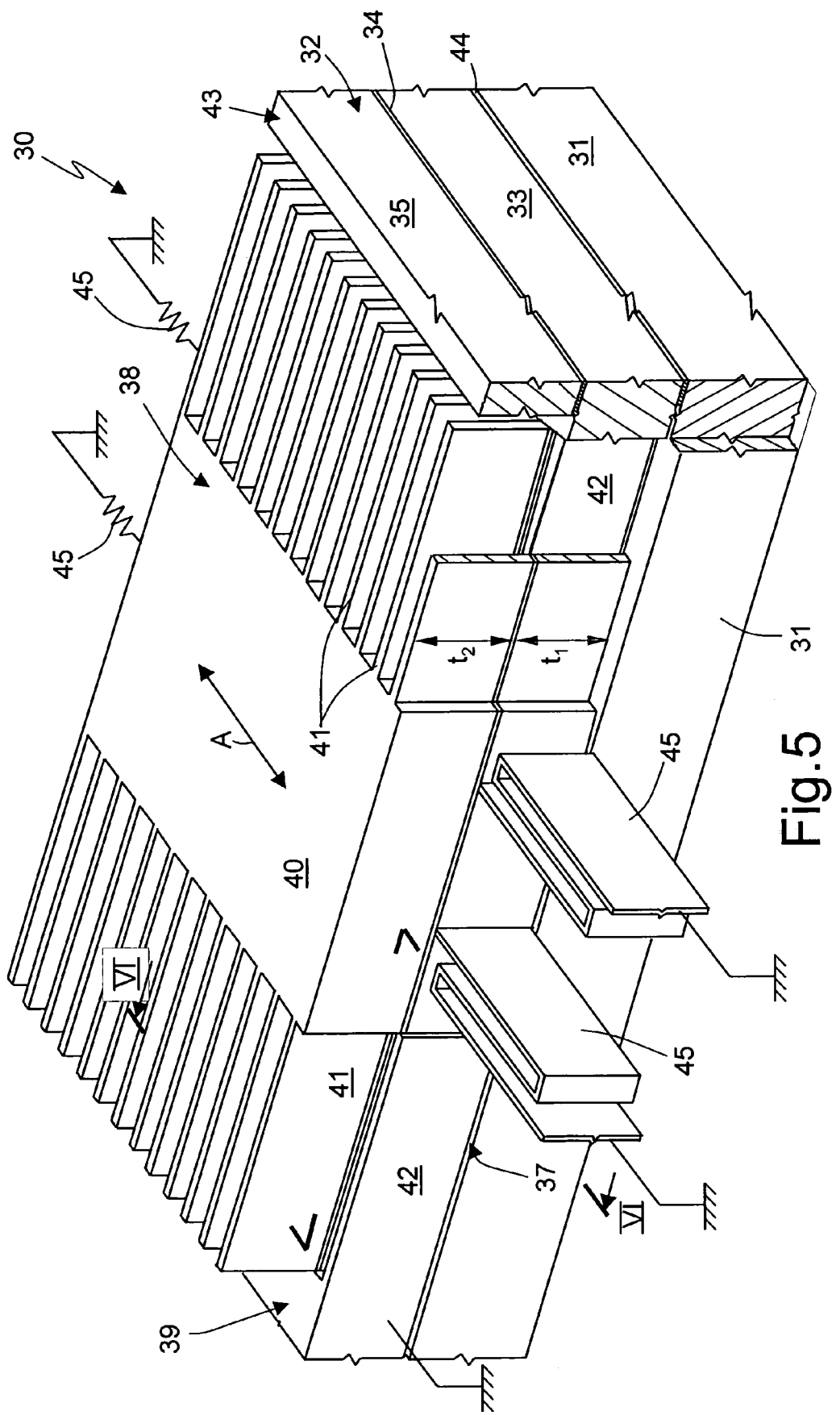
FIG. 5 is a partially ghost perspective view of an embodiment of an inertial sensor according to the invention, of translational type.

With reference to FIG. 5, an inertial sensor 30 comprises a body of semiconductor material formed by a substrate 31 and by a structural layer 32, overlying one another. In the example illustrated, the structural layer 32 is formed by a stack of layers including a bottom semiconductor layer 33, an intermediate dielectric layer 34, and a top semiconductor layer 35. As in the known inertial sensor 1, a rotor 38 and a stator 39 are formed in the structural layer 32; the rotor 38 is moreover supported by elastic elements or springs 45.

As may be noted, here the rotor 38 has a thickness greater than that of the stator 39 and of the springs 45. In fact, the rotor 38 is formed by all the layers 33-35 of the structural layer 32, while the stator 39 and the springs 45 are formed by just the bottom semiconductor layer 33, as is evident particularly from the cross-section of FIG. 6. The rotor 38, the stator 39, and the springs 45 are also here arranged at a distance from the substrate 31 by an air gap 37, which extends here between the substrate 31 and the structural layer 32.

In a way similar to that of the known inertial sensor 1, the rotor 38 comprises a suspended mass 40, mobile electrodes 41 extending from the suspended mass and comb-fingered to fixed electrodes 42. Also here the fixed electrodes 42 extend from a fixed structure 43 resting on the substrate 31 through a sacrificial layer 44, a portion of which has been removed to provide the air gap 37, as explained in greater detail hereinafter. A trench 46 extends between the stator 39 and the rotor 38.

Furthermore, the springs 45 are shaped so as to enable oscillation of the rotor 38 in the direction indicated by the arrow A. Obviously, also here the regions of the fixed structure 43 electrically connected to the rotor 38 through the springs 45 are electrically insulated from the stator 39 with a junction insulation, with a dielectric, or by trenches, in a per se known manner, not illustrated in the drawings.

Figure 6:
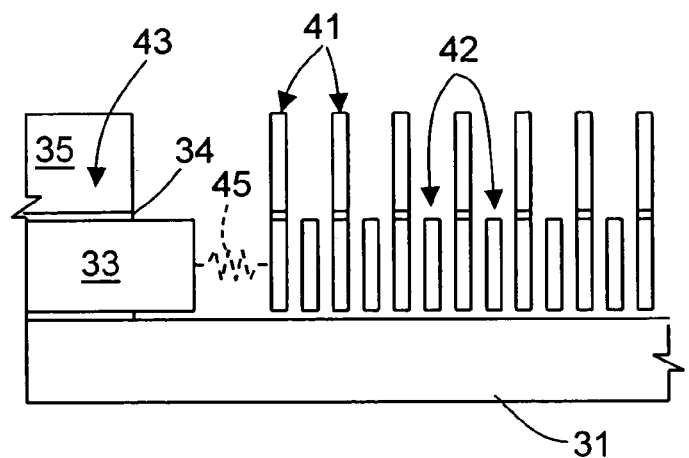
FIG. 6 is a cross-sectional view taken along section line VI-VI of FIG. 5.

In practice, with the inertial sensor 30 illustrated in FIGS. 5 and 6 it is possible to obtain a higher mass with the same occupation of area, maintaining the stiffness of the springs constant, thus increasing the sensitivity of the system, as emerges clearly from Eq. (4). Alternatively, the sensitivity can be increased, maintaining the mass of the system constant and reducing the stiffness of the springs. Likewise, it is possible to increase the mass of the system and the stiffness of the springs proportionally, obtaining a sensor which, given the same sensitivity, occupies a smaller area.

In fact, designating by t1 the thickness of the bottom semiconductor layer 33 and designating by t2 the thickness of the top semiconductor layer 35 and neglecting the thickness due to the intermediate dielectric layer 34, the suspended mass 40 has a height substantially equal to t1+t2, since it is formed throughout the thickness of the structural layer 32, while the fixed electrodes 42 and the springs 45 have a height equal to t1 since they are formed just by the bottom semiconductor layer 33.

Consequently, as compared to a traditional sensor having a structural layer with a thickness equal to the thickness t1 of just the bottom semiconductor layer 33, and given the same length, the springs 45 have equal stiffness k.

Instead, the inertial sensor 30 has a greater mass M, given the greater thickness of the suspended mass 40, equal to t1+t2. Consequently, the inertial sensor 30 has greater sensitivity S.

A first embodiment of a manufacturing process for the structure of FIGS. 5 and 6 is described hereinafter with reference to FIGS. 7-9 corresponding to a cross-section taken through the area of the electrodes 41, 42.

In detail (see FIG. 7), a material wafer 50 comprising a substrate 31 is coated initially with a sacrificial oxide layer 44. For example, the top surface of the substrate 31 can be oxidized thermally, or the sacrificial layer 44 can be deposited. Then, after deposition of a polysilicon germ layer, a first polysilicon growth is carried out, which leads to the formation of a bottom semiconductor layer 33, of polycrystalline silicon, with a thickness, for example, of 15 μm. Then an intermediate dielectric layer 34 is formed, of material that resists etching of the silicon, for example silicon oxide deposited or grown thermally. Typically, the intermediate dielectric layer 34 can have a thickness of 1.6 μm. The intermediate dielectric layer 34 is then defined photolithografically, using a resist mask (not illustrated), so as to form first protective regions, designated again by 34. In practice, the first protective regions do not cover the areas where the bottom semiconductor layer 33 is then to be etched, such as for example for forming the trench 46 between the rotor 38 and the stator 39. Next, after deposition of a further polysilicon germ layer, a second polysilicon growth is performed, which leads to the formation of a top semiconductor layer 35 of polycrystalline silicon with a thickness of, for example, 15 μm. In this way, the structure of FIG. 7 is obtained.

Next, a resist mask 51 is formed over the top semiconductor layer 35. The resist mask 51 is defined to cover the areas of the top semiconductor layer 35 that are to be protected. In particular, the resist mask 51 covers the area where the rotor 38 must be defined (both of the suspended mass 40 and of the mobile electrodes 41; possibly openings in the resist mask 51 can be provided above the suspended mass 40, where through holes are to be formed extending as far as the sacrificial layer 44 to enable its complete removal underneath the suspended mass 40, in a per se known manner. In this case, also the intermediate dielectric layer 34 must have been previously removed in an aligned position to the openings of the resist mask 51). In this way, the structure of FIG. 8 is obtained.

Then, using the resist mask 51, a trench etch is performed, thereby removing the top semiconductor layer 35, where it is uncovered; the etch stops at the intermediate dielectric layer 34. Instead, where the portions of the intermediate dielectric layer 34 have been removed, the etch proceeds, removing the bottom semiconductor layer 33.

Figure 9:
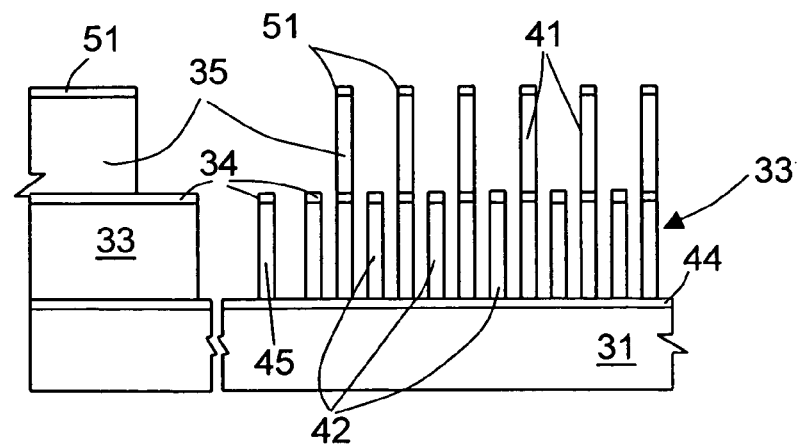
Figure 10:
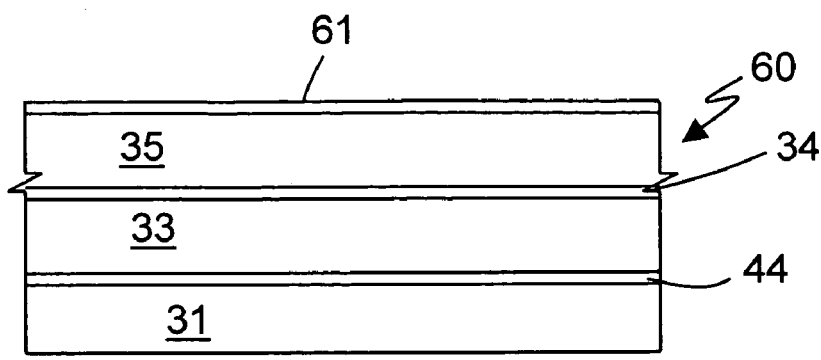
FIGS. 10-15 are cross-sectional views taken along section line VI-VI of FIG. 5, in successive manufacturing steps, according to a second embodiment of the process.

In practice, as may be seen from FIG. 9, the top semiconductor layer 35 is removed above the fixed electrodes 42 and the springs 45, but here the etch stops due to the presence of the intermediate dielectric layer 34. Instead, where the first protective regions 34 are not present, the etch proceeds, and the exposed portions of the bottom semiconductor layer 33 are removed. The trench 46 is thus completed that separates the mobile electrodes 41 from the fixed electrodes 42 and, more in general, the rotor 38 from the stator 39, as well as delimiting the springs 45 (FIG. 5). The structure of FIG. 9 is thus obtained, comprising a spring 45, shown by a dashed line and schematically, which has a known shape (typically, a serpentine extending between the suspended mass 40 and the fixed structure 43), here formed by the bottom semiconductor layer 33 alone.

Finally, an etching step is performed, that causes removal of the sacrificial layer 44 both where it is uncovered and partially underneath the bottom semiconductor layer 33. In practice, given the smaller thickness of the mobile electrodes 41 and of the fixed electrodes 42, these are freed underneath; likewise the suspended mass 40 is freed, thanks to the openings (not illustrated) provided to this end. At the end of this process, the final structure illustrated in FIG. 6 is obtained.

According to a different embodiment, illustrated in FIGS. 10-15, and wherein for sake of simplicity the same reference numbers employed previously are used, the starting point (FIG. 10) is a wafer 60 formed by a stack, which includes a substrate 31, a sacrificial layer 44, a bottom semiconductor layer 33, an intermediate dielectric layer 34, a top semiconductor layer 35, and a top dielectric layer 61, for example of thermal oxide or deposited. The wafer 60 can be obtained in any known way, analogously to the description provided with reference to FIG. 7 (formation of dielectric regions and polysilicon growth after deposition of nucleolus polycrystalline silicon) or using a multiple SOI wafer obtained by bonding monocrystalline silicon wafers.

Figure 11:
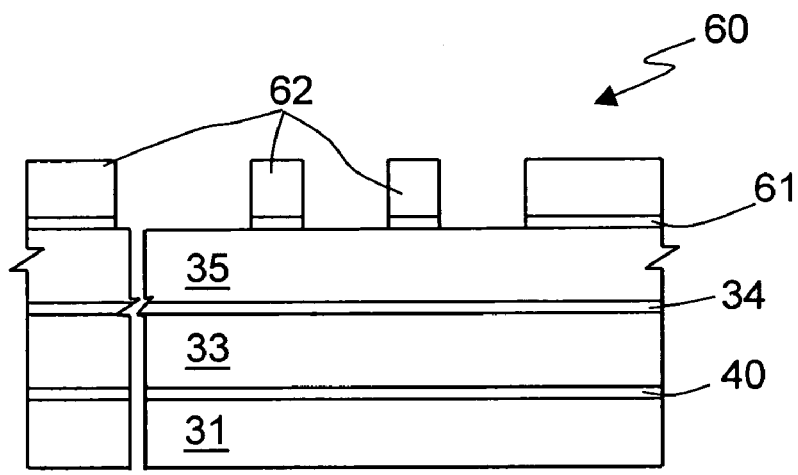

Using a first resist mask 62, first portions of the top dielectric layer 61 are removed (FIG. 11).

Figure 12:
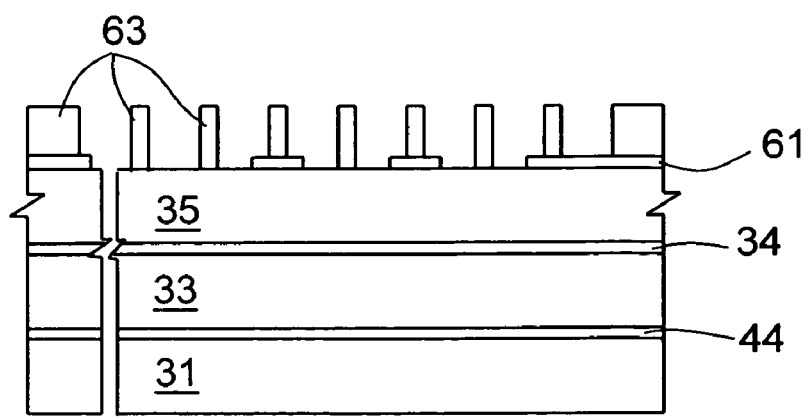

Then, the first resist mask 62 is removed, and a second resist mask 63 is formed (FIG. 12). The second resist mask 63 in part extends on the remaining portions of the top dielectric layer 61, where the top semiconductor layer 35 is not to be removed (rotor and fixed structure 43), and in part extends directly on the top semiconductor layer 35, i.e., regions where the top semiconductor layer 35 but not the bottom semiconductor layer 33 must be removed (typically the fixed electrodes 42 and the springs 45).

Figure 13:
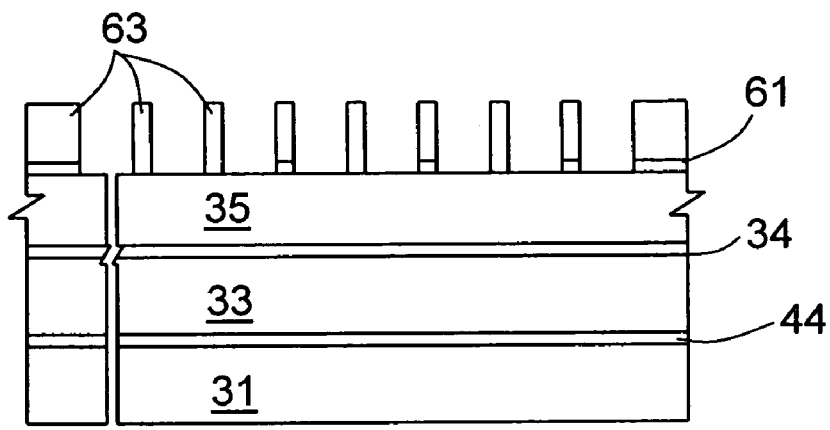
Figure 14:
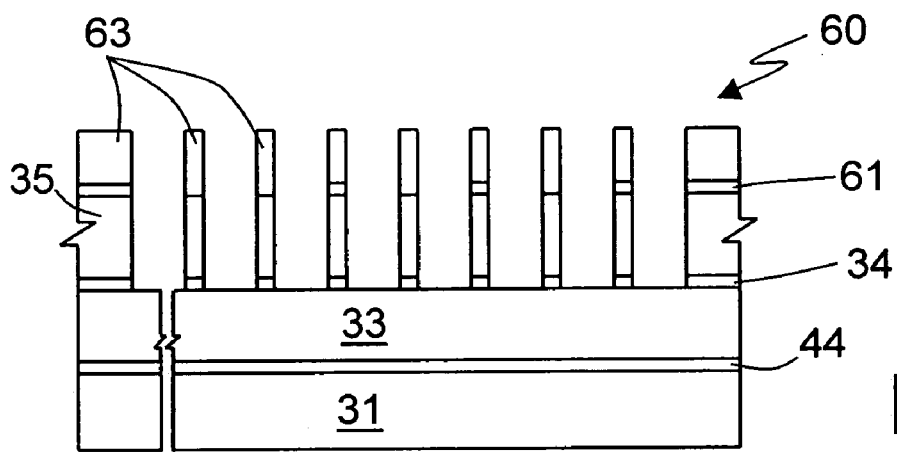

Using the second resist mask 63, first the top dielectric layer 61 is etched (oxide etch, removing the exposed regions of the top dielectric layer 61, to form second protective regions 61, FIG. 13), then the top semiconductor layer 35 is etched (trench etch, removing the exposed portions of the top semiconductor layer 35). Finally, a further oxide etch is performed, removing the exposed portions of the intermediate dielectric layer 34, to form third protective portions 34. The structure of FIG. 14 is thus obtained.

Figure 15:
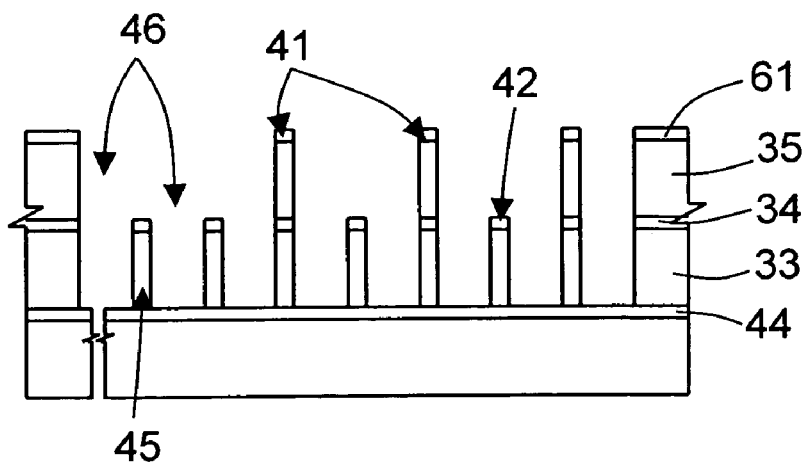

After removing the second resist mask 63, a further trench etch is performed (FIG. 15). In this step, the portions of the top semiconductor layer 35 not covered by the top dielectric layer 61 and no longer covered by the second resist mask 63 are removed; furthermore the exposed portions of the bottom semiconductor layer 33 are removed, where neither the second protective portions 61 nor the third protective portions 34 are present. In this way, the stator 39, the rotor 38, and the springs 45 are defined (FIG. 5), and the top semiconductor layer 35 is removed above the fixed electrodes 42. Thus the structure of FIG. 15 is obtained.

At the end, as described with reference to the first embodiment of the manufacturing process, the sacrificial layer 44 is etched to free the mobile structures, to obtain the final structure of FIG. 6.

Finally, it is clear that numerous modifications and variations can be made to the inertial sensor and to the manufacturing process described and illustrated herein, all falling within the scope of the invention, as defined in the attached claims.

Figure 7:
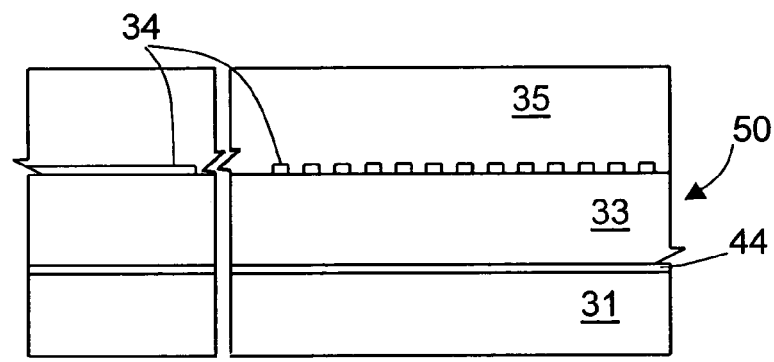
FIGS. 7-9 are cross-sectional views similar to that of FIG. 6, in successive manufacturing steps, according to a first embodiment of the process.
Figure 8:
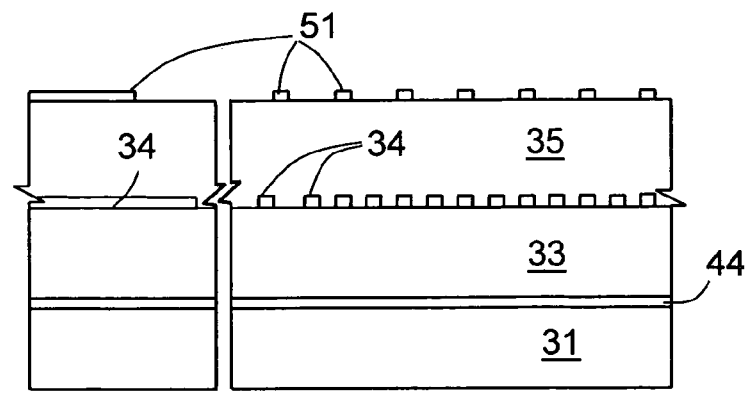

For example, in the first embodiment of the process, the initial structure, formed by the layers 31, 44, 33 of FIG. 7, can also be formed by bonding monocrystalline silicon wafers, and possibly the entire wafer 50 illustrated can be obtained using a dedicated SOI wafer.

With the polysilicon growth process described, when the bottom semiconductor layer 33 is monocrystalline and it is necessary to integrate electronic components in the same wafer, it is possible to remove portions of the intermediate dielectric layer 34 on the side of the sensor area so as to cause the top semiconductor layer 35 to grow in a monocrystalline form.

Figure 1:
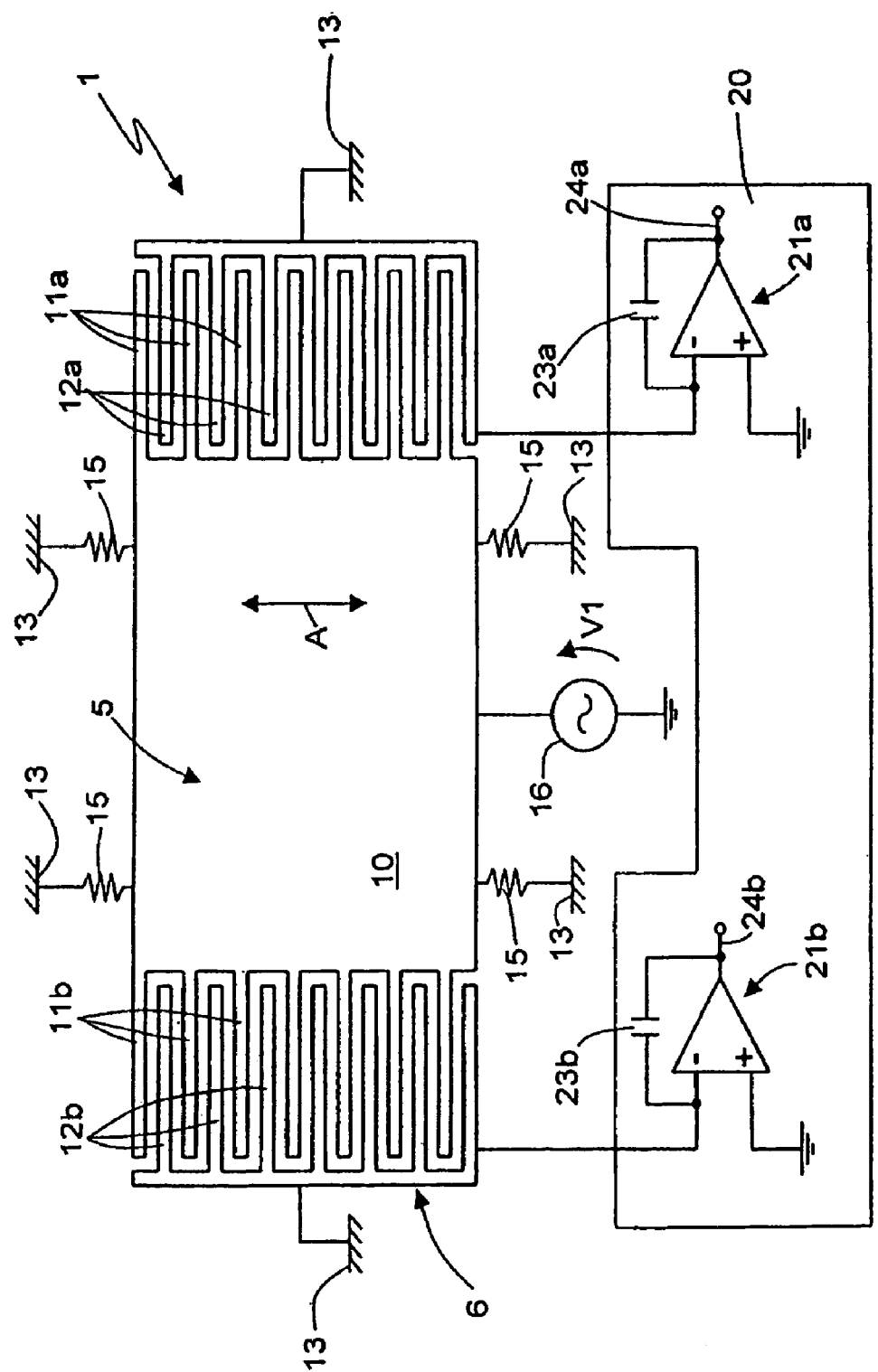
FIG. 1 is a schematic top view of a known inertial sensor, of translational type.
Figure 2:
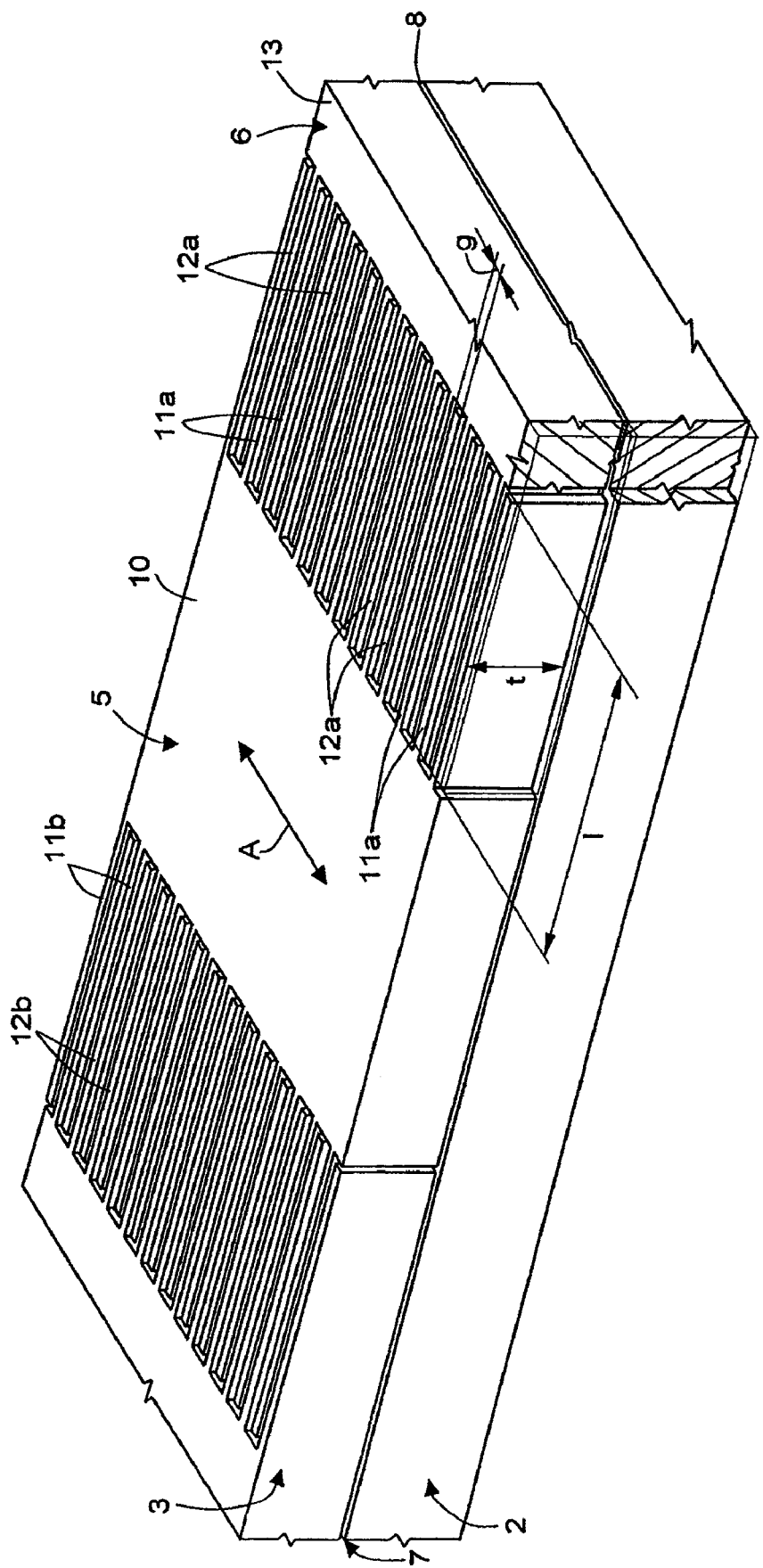
FIG. 2 is a partially broken perspective view of the inertial sensor of FIG. 1.
Figure 3:
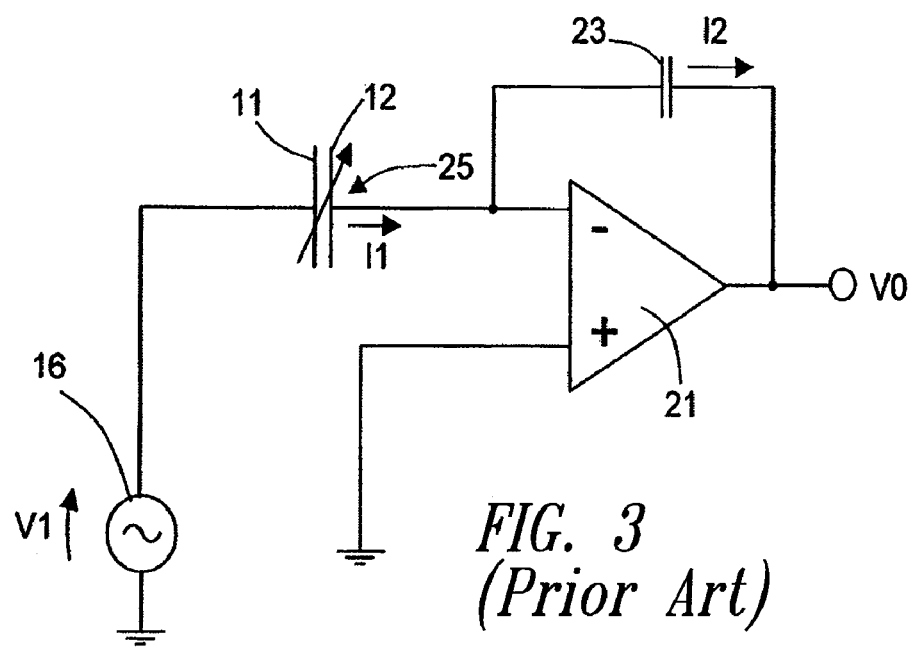
FIG. 3 shows an equivalent circuit of the inertial sensor of FIG. 1.
Figure 4:
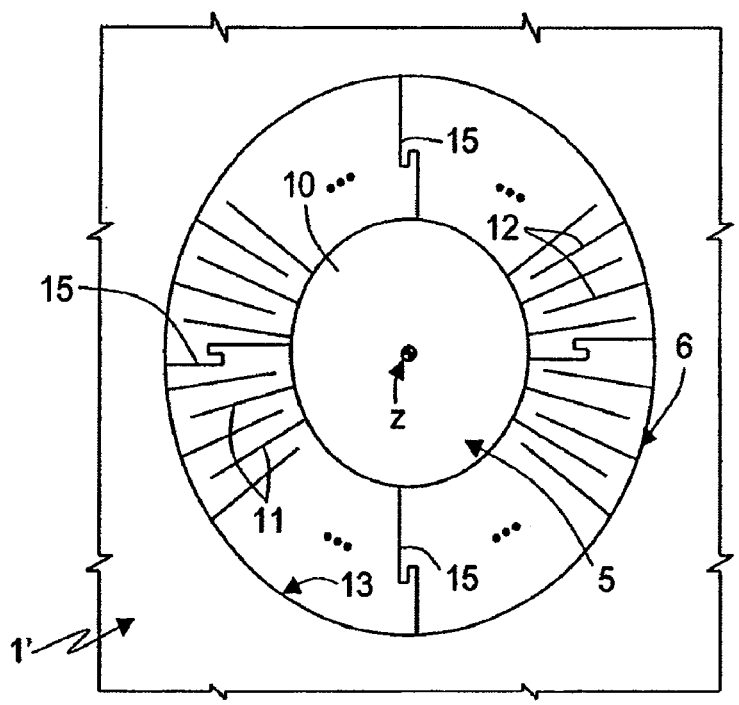
FIG. 4 is a schematic top view of a known inertial sensor of rotational type.

Finally, the same solution based onto a height difference, as described for the suspended mass and the elastic suspension elements, may be applied also to an inertial sensor of rotational type, such as the one illustrated in FIG. 4, where consequently the springs 15 are formed only in the bottom semiconductor layer 33.

In addition, differently from the figures, also the stator 39 (6 in FIG. 4) may be formed in the entire structural layer 32 and thus have a thickness t1+t2.

Various principles of the invention have been described with reference to inertial sensor type MEMS devices. Other embodiments of the invention include other types of MEMS devices including, for example, motors, adjustable mirrors, gyroscopes, etc. In particular, it will be recognized that by employing principles disclosed herein, MEMS devices can be designed in which the mass or thickness of a rotor element and the flexibility of a spring element can be selected independently, without sacrificing additional surface area of a substrate.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor inertial sensor, comprising:
a fixed region;
a rotor element having a first semiconductor layer, an intermediate layer positioned on the first semiconductor layer, and a second semiconductor layer positioned on the intermediate layer; and
a stator element formed from the first semiconductor layer and electrostatically coupled to the rotor element, said rotor element comprising a suspended mass carried by said fixed region via elastic suspension elements formed in said first semiconductor layer, said suspended mass having a first thickness and said elastic suspension elements having a second thickness, different from said first thickness.

2. The semiconductor inertial sensor according to claim 1 wherein said first thickness is greater than said second thickness.

3. The semiconductor inertial sensor according to claim 1, comprising a supporting substrate arranged directly underneath said rotor element, wherein said rotor element directly faces said substrate and is arranged at a distance therefrom via an air gap.

4. The semiconductor inertial sensor according to claim 1 wherein said rotor element comprises a plurality of mobile electrodes extending from said suspended mass, and said stator element comprising a plurality of fixed electrodes facing respective said mobile electrodes, said mobile electrodes having said first thickness and said fixed electrodes having said second thickness.

5. The semiconductor inertial sensor according to claim 4 wherein said sensor is a translational type sensor, and wherein said suspended mass has a polygonal shape with at least two first opposite sides and two second opposite sides, said mobile electrodes extending from said first opposite sides and said elastic suspension elements extending from said second opposite sides, and said fixed electrodes facing said mobile electrodes.

6. The semiconductor inertial sensor according to claim 4 wherein said sensor is a rotational type sensor, and wherein said suspended mass has a circular shape, said mobile electrodes extending radially from said suspended mass and said fixed electrodes extending radially towards said suspended mass, comb-fingered to said mobile electrodes, said elastic suspension elements extending in a generally radial direction between said suspended mass and said fixed region.

7. A micro-electro-mechanical device, comprising:
a semiconductor substrate;
a rotor having a suspended mass a first thickness positioned in a spaced-apart relationship with the substrate wherein the semiconductor substrate extends directly below the suspended mass; and
an elastic suspension element having a second thickness, different from the first thickness, coupled between the rotor and the substrate wherein the rotor includes portions of first and second semiconductor material layers formed on the substrate, and the suspension element includes a portion of the first semiconductor material layer.

8. The device of claim 7, further comprising a detector circuit configured to detect movement of the rotor, relative to the substrate, along an axis lying parallel to a face of the substrate.

9. The device of claim 8 wherein the detector circuit is formed in the substrate.

10. The device of claim 8, further comprising a stator rigidly coupled to the substrate, and wherein the detector circuit is configured to detect changes in capacitive coupling between the rotor and the stator.

11. A system, comprising:
an inertial sensor formed on a semiconductor material substrate, the inertial sensor including:
  a rotor having a suspended mass in a spaced-apart relationship with a surface of the substrate wherein the surface of the substrate extends directly below the suspended mass, the rotor having a first thickness,
  a stator rigidly coupled to the substrate, and
  a spring element having a second thickness, different from the first thickness, the spring element coupled between the rotor and the substrate wherein the rotor includes a first semiconductor layer, an intermediate layer positioned on the first semiconductor layer, and a second semiconductor layer positioned on the intermediate layer.

12. The system of claim 11, further comprising:
an apparatus including a standby function; and
a detector circuit coupled to the inertial sensor and configured to initiate a restoration of functionality of the apparatus upon detection of movement by the sensor.

13. The system of claim 11, further comprising:
an automobile; and
a detector circuit coupled to the inertial sensor and configured to detect movement of the automobile.

14. The system of claim 11 wherein the intermediate layer is a dielectric layer.

15. The semiconductor inertial sensor according to claim 1 wherein the intermediate layer is a dielectric layer.

16. The system of claim 7 wherein the rotor includes a the first semiconductor material layer, an intermediate layer positioned on the first semiconductor material layer, and the second semiconductor material layer positioned on the intermediate layer.

17. The system of claim 16 wherein the intermediate layer is a dielectric layer.

\* \* \* \* \*

UNITED STATES PATENT AND TRADEMARK OFFICE
CERTIFICATE OF CORRECTION

PATENT NO. : 7,270,003 B2  
APPLICATION NO. : 11/189544  
DATED : September 18, 2007  
INVENTOR(S) : Simone Sassolini et al.

Page 1 of 1

It is certified that error appears in the above-identified patent and that said Letters Patent is hereby corrected as shown below:

Title page Item [56] References Cited
"5,016,073 A ... 5/1991 ... Elliott et al. ... 357/26" should read as -- 5,016,072 A ... 5/1991 ... Greiff ... 357/26 --

Column 8
Line 53 claim 7, "a suspended mass a first thickness" should read as -- a suspended mass having a first thickness --

Column 10
Lines 15-16 claim 16, "wherein the rotor includes a the first semiconductor material layer," should read as -- wherein the rotor includes the first semiconductor material layer, --

Signed and Sealed this

Second Day of September, 2008

JON W. DUDAS  
*Director of the United States Patent and Trademark Office*

UNITED STATES PATENT AND TRADEMARK OFFICE
CERTIFICATE OF CORRECTION

PATENT NO. : 7,270,003 B2
APPLICATION NO. : 11/189544
DATED : September 18, 2007
INVENTOR(S) : Simone Sassolini et al.

It is certified that error appears in the above-identified patent and that said Letters Patent is hereby corrected as shown below:

Title page Item [54] Title
"BMEMS-TYPE HIGH-SENSITIVITY INERTIAL SENSOR AND MANUFACTURING PROCESS THEREOF" should read as -- MEMS-TYPE HIGH-SENSITIVITY INERTIAL SENSOR AND MANUFACTURING PROCESS THEREOF --

Title page Item [56] References Cited
"5,016,073 A ... 5/1991 ... Elliott et al. ... 357/26" should read as
-- 5,016,072 A ... 5/1991 ... Greiff ... 357/26 --

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,270,003 B2  
APPLICATION NO. : 11/189544  
DATED             : September 18, 2007  
INVENTOR(S)      : Simone Sassolini et al.

Page 1 of 1

It is certified that error appears in the above-identified patent and that said Letters Patent is hereby corrected as shown below:

Title page Item [54] and Column 1, lines 1-3, Title
"BMEMS-TYPE HIGH-SENSITIVITY INERTIAL SENSOR AND MANUFACTURING PROCESS THEREOF" should read as -- MEMS-TYPE HIGH-SENSITIVITY INERTIAL SENSOR AND MANUFACTURING PROCESS THEREOF --

Title page Item [56] References Cited
"5,016,073 A ... 5/1991 ... Elliott et al. ... 357/26" should read as
-- 5,016,072 A ... 5/1991 ... Greiff ... 357/26 --

This certificate supersedes the Certificate of Correction issued May 26, 2009.

Signed and Sealed this

Sixteenth Day of June, 2009

JOHN DOLL  
*Acting Director of the United States Patent and Trademark Office*